(12) United States Patent
Jung et al.

(10) Patent No.: US 10,604,035 B2
(45) Date of Patent: Mar. 31, 2020

(54) PORTABLE CAR SEAT

(71) Applicant: DONG-IN ENTECH CO., LTD., Gimpo-si, Gyeonggi-do (KR)

(72) Inventors: In Soo Jung, Goyang-si (KR); Moo Kyung Kim, Gimpo-si (KR); Gwon Je Sung, Seoul (KR); Kyeong Dong Lee, Gimpo-si (KR)

(73) Assignee: DONG-IN ENTECH CO., LTD., Gimpo-si, Gyeonggi-Do (KR)

( * ) Notice: Subject to any disclaimer, the term of this patent is extended or adjusted under 35 U.S.C. 154(b) by 0 days.

(21) Appl. No.: 16/073,599

(22) PCT Filed: Mar. 16, 2016

(86) PCT No.: PCT/KR2016/002653
§ 371 (c)(1),
(2) Date: Jul. 27, 2018

(87) PCT Pub. No.: WO2017/131282
PCT Pub. Date: Aug. 3, 2017

(65) Prior Publication Data
US 2019/0039485 A1 Feb. 7, 2019

(30) Foreign Application Priority Data

Jan. 29, 2016 (KR) ........................ 10-2016-0011596

(51) Int. Cl.
*B60N 2/28* (2006.01)
*B60N 2/68* (2006.01)
*B60N 2/64* (2006.01)
*B60R 22/10* (2006.01)
*B60N 2/26* (2006.01)

(52) U.S. Cl.
CPC ............... *B60N 2/286* (2013.01); *B60N 2/26* (2013.01); *B60N 2/265* (2013.01); *B60N 2/28* (2013.01); *B60N 2/2851* (2013.01); *B60N 2/64* (2013.01); *B60N 2/68* (2013.01); *B60R 22/10* (2013.01); *B60N 2002/2896* (2013.01)

(58) Field of Classification Search
CPC .......... B60N 2/286; B60N 2/26; B60N 2/265; B60N 2/28; B60N 2/2851; B60N 2/64; B60N 2/68; B60N 2002/2896; B60R 22/10
USPC ..................................... 297/378.12
See application file for complete search history.

(56) References Cited

U.S. PATENT DOCUMENTS 6,079,780 A * 6/2000 Bapst .................. B60N 2/2806
116/200
6,290,292 B1 9/2001 Tsukada
(Continued)

FOREIGN PATENT DOCUMENTS

JP H05-63967 U 8/1993
JP H07-101276 A 4/1995
(Continued)

*Primary Examiner* — Mark R Wendell
(74) *Attorney, Agent, or Firm* — Rabin & Berdo, P.C.

(57) ABSTRACT

The present invention relates to a portable car seat comprising: a seat part on which a child sits; a backrest part rotatably coupled to the seat part; a rotation connection part for rotating the seat part and the backrest part; and a rotation prevention part for restricting rotation, performed by the rotation connection part, through a stopper for preventing rotation.

11 Claims, 9 Drawing Sheets

(56) References Cited

U.S. PATENT DOCUMENTS

| | | | |
|---|---|---|---|
| 7,857,385 B2 | 12/2010 | Zink et al. | |
| 2006/0138823 A1* | 6/2006 | Huang | B60N 2/2866 |
| | | | 297/250.1 |
| 2008/0018152 A1* | 1/2008 | Vadai | B60N 2/0284 |
| | | | 297/255 |
| 2008/0073954 A1* | 3/2008 | Paulson | B60N 2/28 |
| | | | 297/219.12 |
| 2008/0224512 A1 | 9/2008 | Mendenhall | |
| 2008/0224513 A1 | 9/2008 | Zink et al. | |
| 2008/0224514 A1 | 9/2008 | Zink et al. | |
| 2008/0258524 A1* | 10/2008 | Zink | B60N 2/2866 |
| | | | 297/250.1 |
| 2008/0258525 A1* | 10/2008 | Mendenhall | B60N 2/28 |
| | | | 297/250.1 |
| 2011/0109138 A1* | 5/2011 | Inoue | B60N 2/2806 |
| | | | 297/256.13 |

FOREIGN PATENT DOCUMENTS

| | | |
|---|---|---|
| JP | 2000-343993 A | 12/2000 |
| JP | 2004-149018 A | 5/2004 |
| KR | 20-1998-0015905 U | 6/1998 |
| KR | 20-0282290 Y1 | 7/2002 |
| KR | 20-0299154 Y1 | 1/2003 |
| KR | 20-0438960 Y1 | 3/2008 |
| KR | 10-2014-0008117 A | 1/2014 |
| WO | 2005079159 A2 | 9/2005 |

* cited by examiner (a)          (b)

PORTABLE CAR SEAT

TECHNICAL FIELD

The present invention relates to a portable car seat.

BACKGROUND ART

Generally, various vehicles, such as a passenger vehicle, are driven while a seat belt is fastened for passenger's safety. However, since most seat belts and safety devices attached to a vehicle are installed based on an adult, there is a problem in that an infant or child accompanying a driver may be injured when a car accident occurs due to a rear end vehicle collision, car crashes, or the like.

Because it is difficult for the infant or child who is relatively smaller than an adult to fasten a seat belt, they are easily exposed to a great danger, and when the seat belt is used for an infant or child anyway, since the seat belt is not designed to fit a body size of the infant or child, an abdomen or neck portion (corresponding to a position of the seat belt) of the infant or child may be injured.

Recently, to solve such problems, a separate infant protective seat, called an infant car seat, is mounted on a seat of a vehicle, and a vehicle is driven while an infant sits on the infant car seat.

The main function of the infant car seat is to maximally absorb and disperse an impact generated in vehicle collision before the impact is transmitted to an infant in the car. A lifesaving effect of the infant car seat is certain. The percentage of cases of serious injury or death is less than 40% when the infant car seat is used as opposed to when it is not, the ratio of casualties who use infant car seat is less than ⅓ of all the casualties, and the percentage of serious injuries or death out of the casualties who use infant car seat reaches 1.17%. According to national laws for the safety of infant or child, such as the Road Traffic Law, it is necessary to mount an infant protective device to a vehicle when an infant or child is accompanying, but the law is not followed well in practice.

Since a device that helps an infant safely ride a current vehicle is not mounted on the vehicle, there is an inconvenience in that a separate infant car seat should be directly purchased and mounted on the vehicle. Further, since the infant car seat is inconvenient to carry due to the large weight and size thereof, in many cases, a driver does not mount and use the infant car seat even when the infant car seat has been purchased.

Therefore, much research and development has been done to increase use of the infant car seat so as to secure the safety of an infant or child and protect a life of an infant or child, and also to increase safety of the infant car seat.

DISCLOSURE

Technical Problem

The present invention is directed to providing a portable car seat which secures safety of an infant in a vehicle and facilitates portability.

Technical Solution

One aspect of the present invention provides a portable car seat including a seat part on which an infant sits and which is mounted on a car seat, a backrest part rotatably coupled to one side of the seat part, a rotation connection part configured to rotatably connect the seat part to the backrest part, and a rotation prevention part configured to restrict relative rotation of the backrest part and the seat part which occurs due to the rotation connection part, wherein the rotation prevention part includes a stopper provided on the backrest part to prevent rotation toward a space in which the infant sits.

The backrest part may include a first backrest frame which is in direct contact with the infant and has a rotation preventing point which is in contact with the car seat, and a second backrest frame connected with the first backrest frame to be spaced apart a predetermined distance and having an axis of rotation, wherein the stopper may be configured to prevent the seat part and the backrest part from being folded by the rotation connection part toward a space in which the infant sits, and the rotation preventing point may prevent additional rotation.

The rotation preventing point may be formed to be spaced apart from the rotation origin a predetermined distance forward, the stopper may be formed above the rotation preventing point, the rotation preventing point may primarily prevent rotation, and the stopper may secondarily prevent rotation.

The rotation connection part may be provided under the second backrest frame, and the stopper may be provided under the first backrest frame connected with the second backrest frame to be spaced apart a predetermined distance and may prevent the seat part and the backrest part from being folded toward a space in which the infant sits due to the rotation connection part.

The rotation preventing part may restrict an angle from the second backrest frame to the seat part in a counterclockwise direction from being less than or equal to 90° and may allow the seat part to rotate about the second backrest frame in a counterclockwise direction by an angle greater than 90° and less than 360°.

The portable car seat may further include a headrest part configured to protect a head of the infant from the car seat which is connected to an upper side of the backrest part, wherein the headrest part may be rotatably connected to the backrest part.

The headrest part may be connected to the backrest part to be folded toward a space in which the infant sits.

The headrest part may be connected to the backrest part by a Velcro-type member on a side opposite to the space in which the infant sits.

The headrest part may include a front supporting part configured to support the back of a head of the infant, a left supporting part configured to support the left of the head of the infant, and a right supporting part configured to support the right of the head of the infant, wherein the left supporting part or the right supporting part may be adjustable on the front supporting part to surround the head of the infant.

The left supporting part or the right supporting part may be bendable to be inclined toward the head of the infant from the front supporting part.

The belt for fastening the infant to the backrest part or the seat part may be mounted on the backrest part rather than the car seat.

Advantageous Effects

The portable car seat according to the present invention can increase portability of the car seat by being formed as a foldable type and can practically secure safety of an infant by increasing a rate of mounting the car seat in a vehicle.

Further, the portable car seat according to the present invention can remarkably increase safety functions of the portable car seat by accommodating a mechanical structure of the car seat to be supported on a vehicle seat to reduce rotational momentum of the portable car seat despite a foldable configuration which increases portability.

MODES OF THE INVENTION

Figure 1:
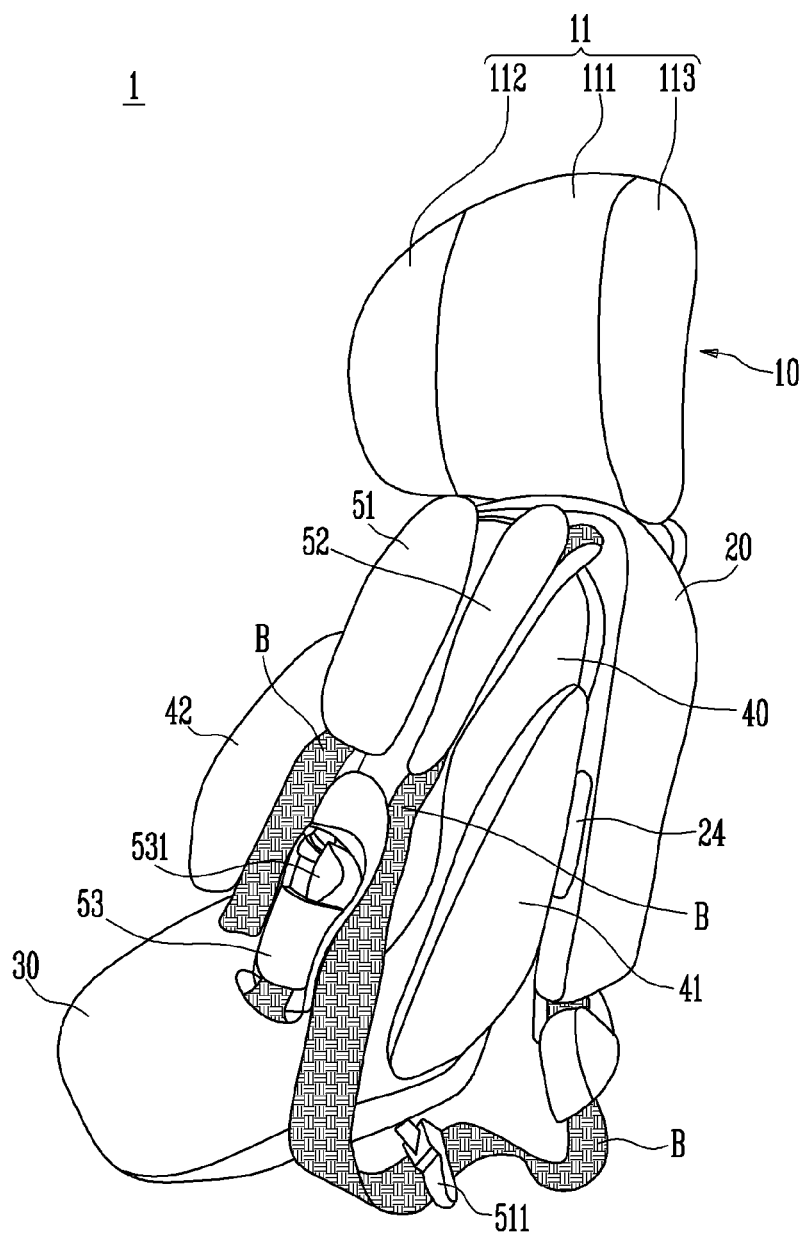
FIG. 1 is a perspective view of a portable car seat according to one embodiment of the present invention.

Purposes, specific advantages, and novel features of the present invention will be made clear from exemplary embodiments and the following detailed descriptions in connection with the accompanying drawings. In this specification, it should be noted that the same reference numerals may be assigned to the same components in different drawings whenever possible. When detailed descriptions of related well-known technology are deemed to unnecessarily obscure the gist of the present invention in the descriptions of the present invention, they will be omitted.

Hereinafter, various embodiments of the present invention will be described in detail with reference to the accompanying drawings.

Figure 2:
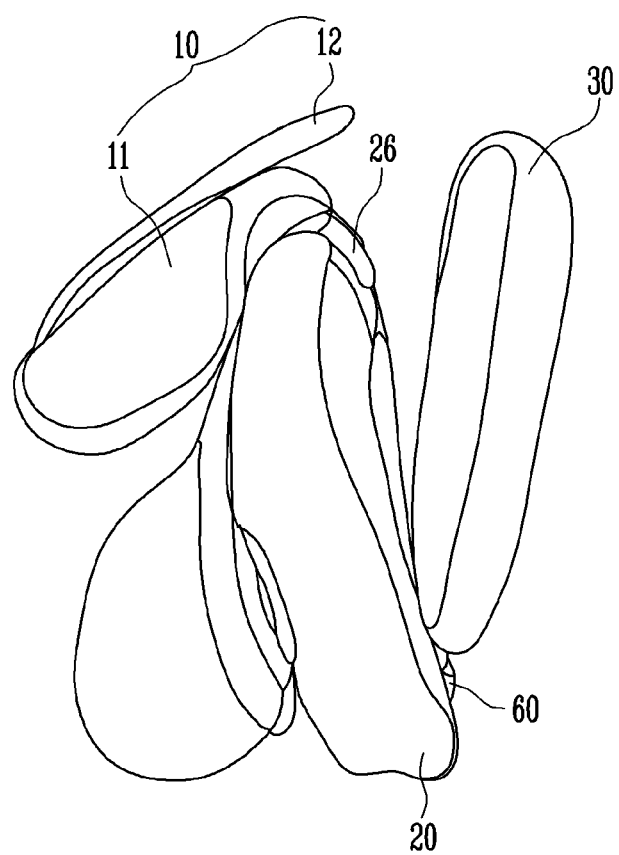
FIG. 2 is an operational perspective view of the portable car seat according to one embodiment of the present invention.
Figure 3:
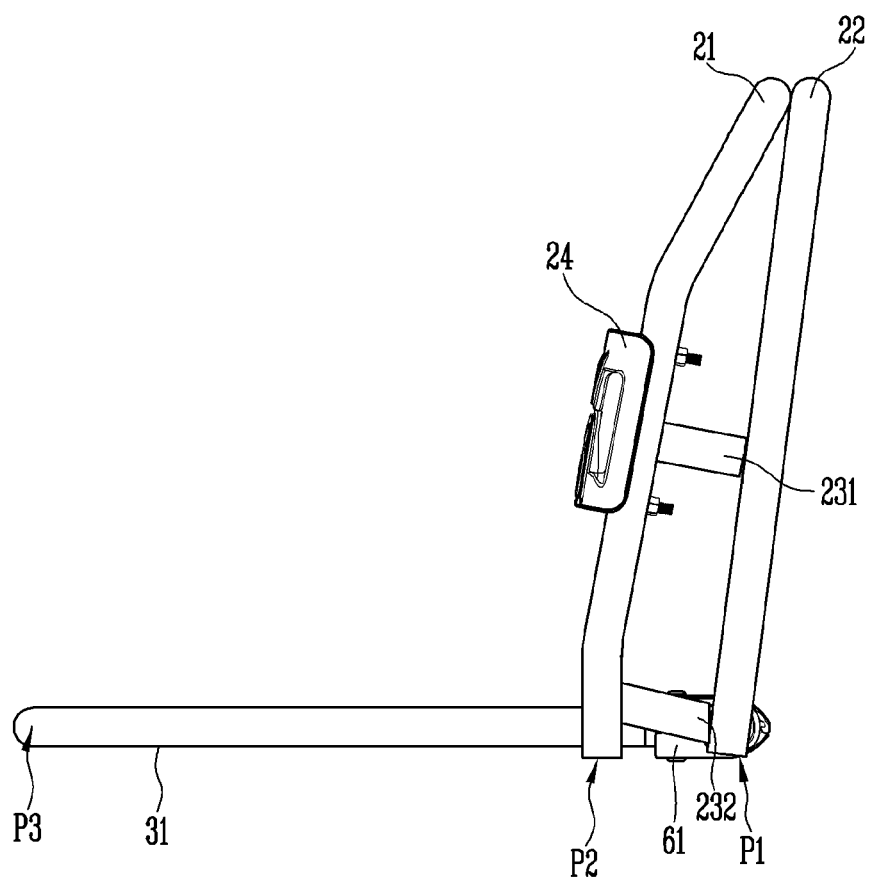
FIG. 3 is a side view of a frame of the portable car seat according to one embodiment of the present invention.
Figure 4:
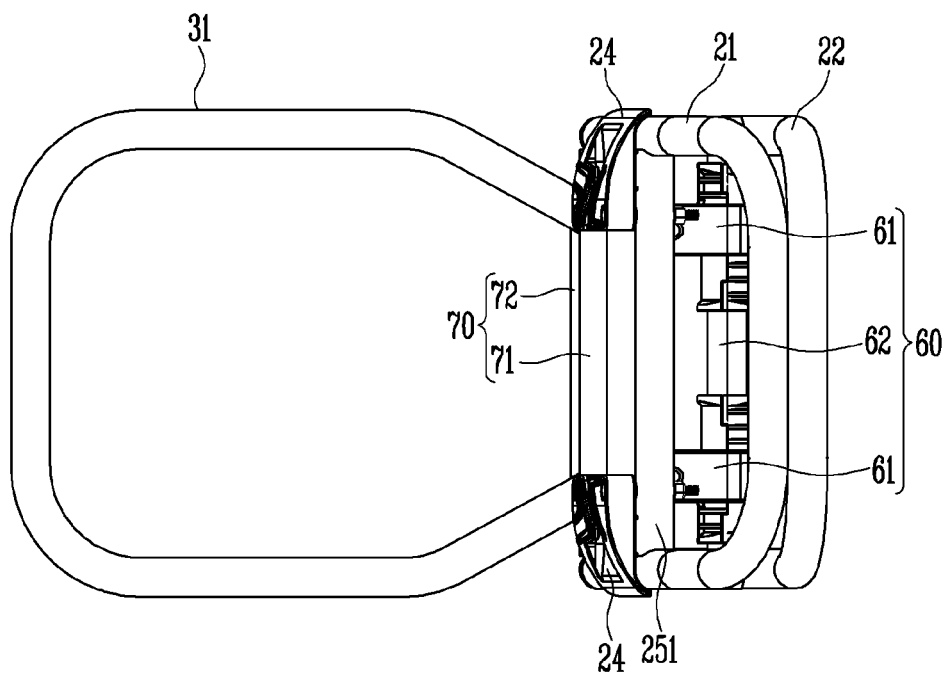
FIG. 4 is a plan view of the frame of the portable car seat according to one embodiment of the present invention.
Figure 5:
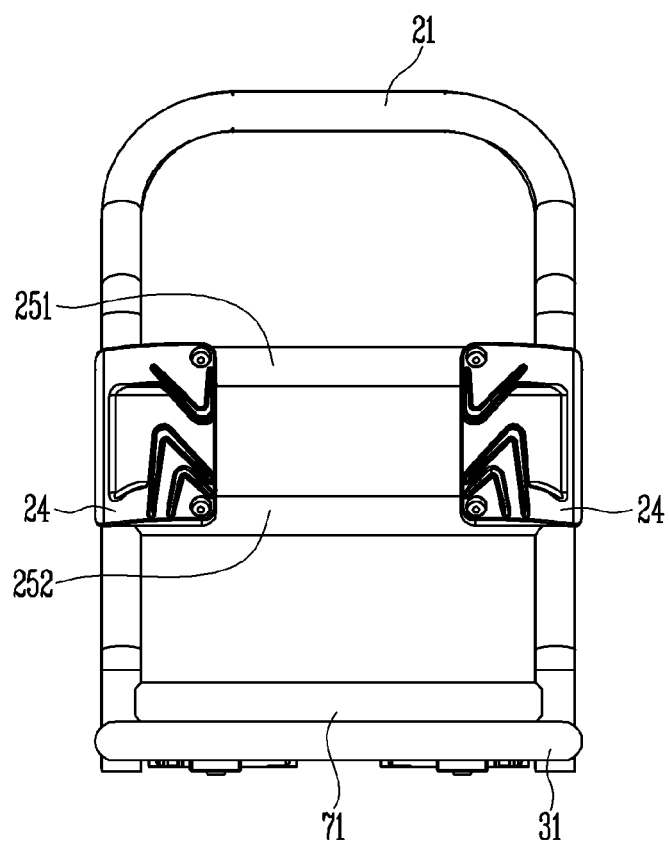
FIG. 5 is a front view of the frame of the portable car seat according to one embodiment of the present invention.
Figure 6:
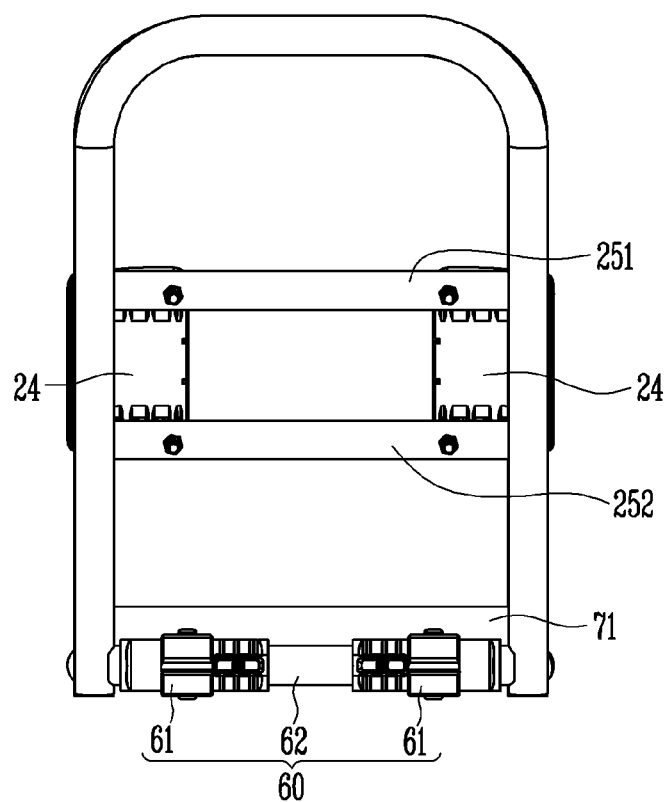
FIG. 6 is a rear view of the frame of the portable car seat according to one embodiment of the present invention.
Figure 7:
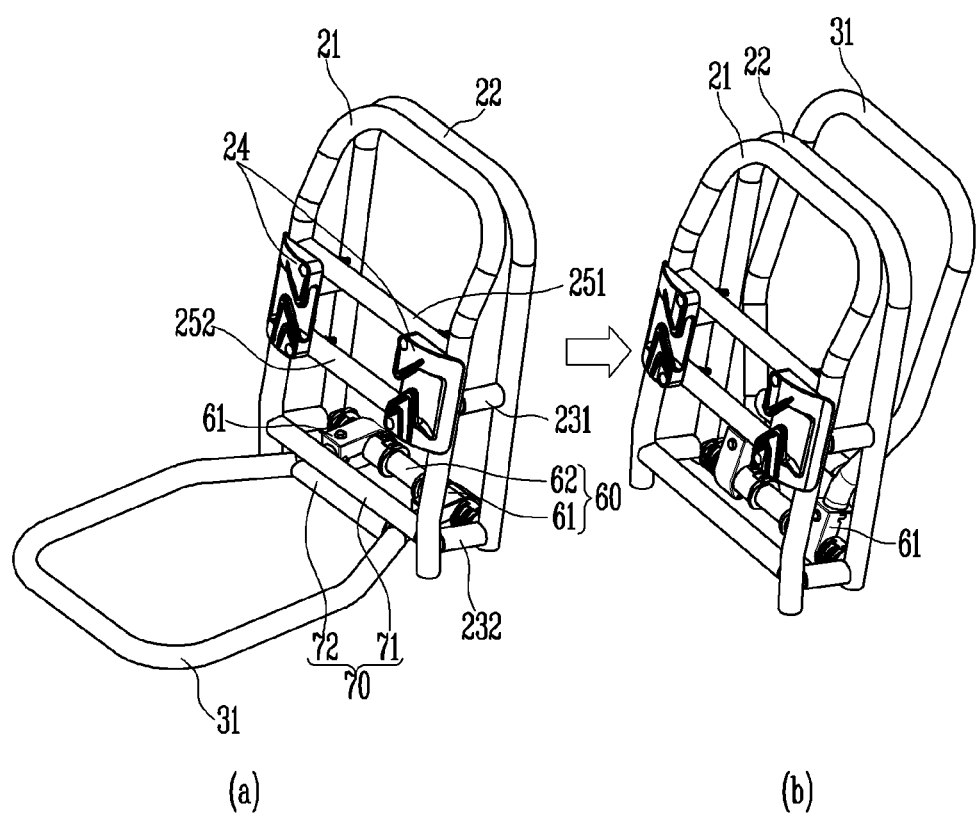
FIG. 7 is an operational perspective view of the frame of the portable car seat according to one embodiment of the present invention.
Figure 8:
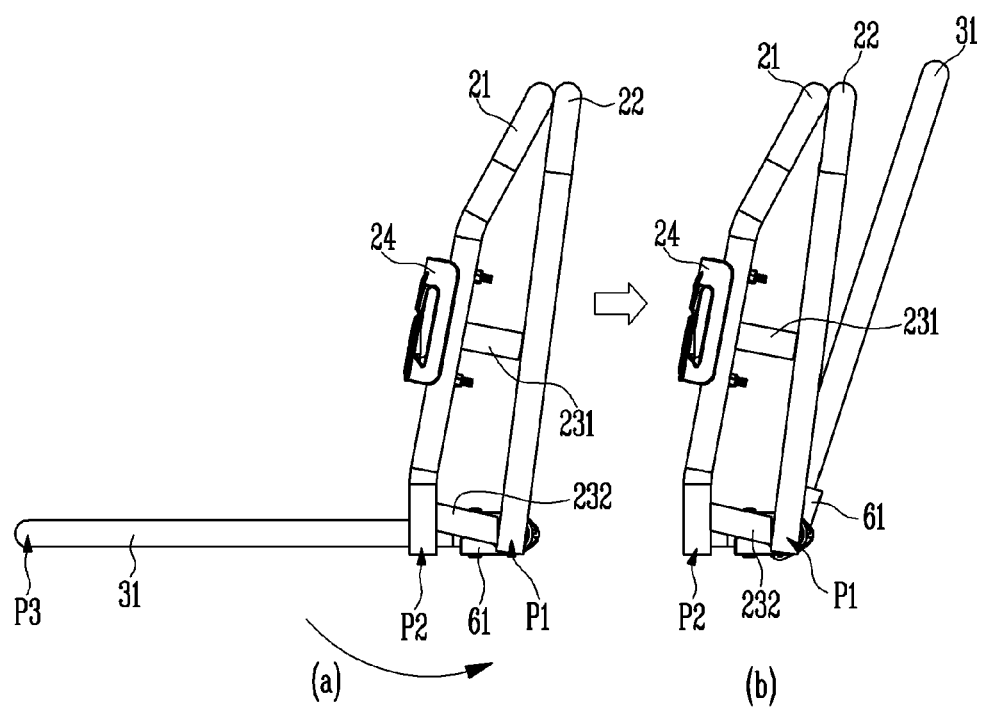
FIG. 8 is an operational side view of the frame of the portable car seat according to one embodiment of the present invention.
Figure 9:
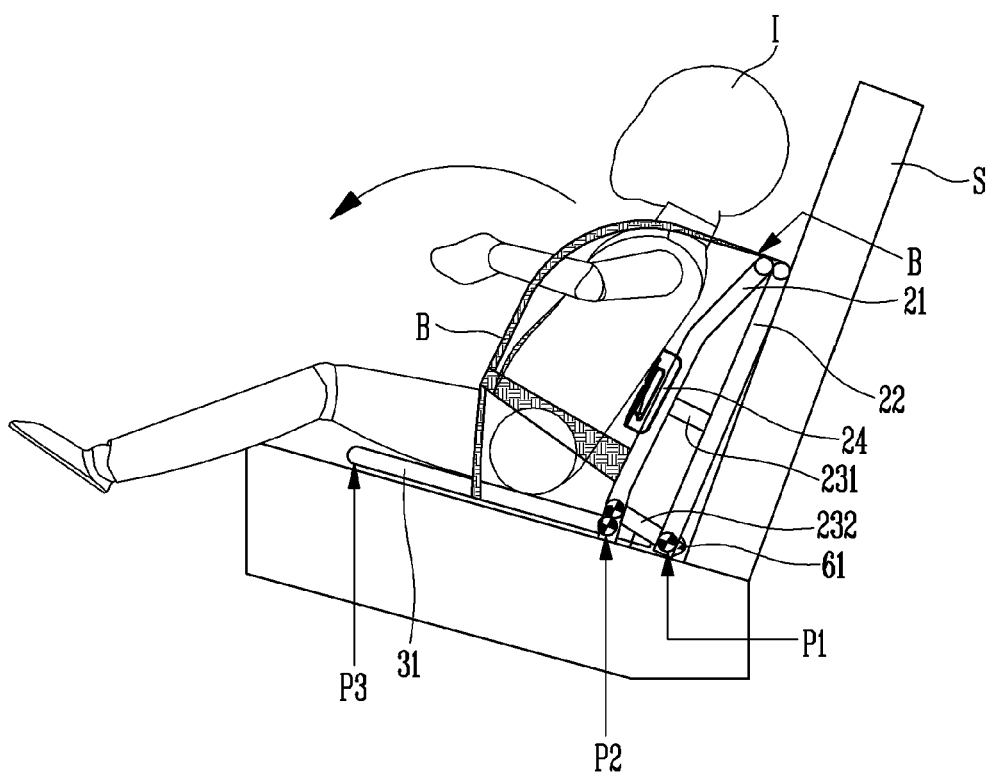
FIG. 9 is a perspective view showing an infant sitting on the portable car seat according to one embodiment of the present invention.

FIG. 1 is a perspective view of a portable car seat according to one embodiment of the present invention, FIG. 2 is an operational perspective view of the portable car seat according to one embodiment of the present invention, FIG. 3 is a side view of a frame of the portable car seat according to one embodiment of the present invention, FIG. 4 is a plan view of the frame of the portable car seat according to one embodiment of the present invention, FIG. 5 is a front view of the frame of the portable car seat according to one embodiment of the present invention, FIG. 6 is a rear view of the frame of the portable car seat according to one embodiment of the present invention, FIG. 7 is an operational perspective view of the frame of the portable car seat according to one embodiment of the present invention, FIG. 8 is an operational side view of the frame of the portable car seat according to one embodiment of the present invention, and FIG. 9 is a perspective view showing an infant siting on the portable car seat according to one embodiment of the present invention.

As shown in FIGS. 1 to 9, a portable car seat 1 according to one embodiment of the present invention includes a headrest part 10, a backrest part 20, a seat part 30, a rotation connection part 60, and a rotation prevention part 70.

Hereinafter, the configurations will be described in detail with reference to FIGS. 1 to 9.

The headrest part 10 is positioned above the backrest part 20 and formed at a portion which is in contact with back of a head (not numbered) to support the head when an infant I sits on the seat part 30, thus effectively protecting the head of the infant I. The headrest part 10 is mounted on the headrest part (not numbered) of a car seat S when the portable car seat 1 is installed in a vehicle (not shown).

Specifically, the headrest part 10 is connected to an upper side of the backrest part 20 to be in direct contact with the back of the head of the infant I. A frame (not shown) is formed in the headrest part 10 to support the back of the head, and a cushion filled with an elastic material, such as cotton, sponge, spring, or the like, is formed to effectively protect the back of the head. An exterior of the headrest part 10 is formed as a cover to cover an interior of the headrest part 10 so as to protect the interior from external contaminants and to provide a soft surface for the cover when the infant I is pressed against the cover.

Further, the headrest part 10 includes a headrest body part 11 and a first Velcro-connection part 12 which may be connected to the backrest part 20 to be folded forward. The forward-folding means that the headrest part 10 is folded toward a space in which the back of the head of the infant is positioned.

The headrest body part 11 may be connected to be bendable so that a lower end of a front surface (not numbered), which is a surface facing the back of the head of the infant I, is folded forward onto an upper end of the backrest part 20, and the first Velcro-connection part 12 described below is provided on a rear surface (not numbered) of the headrest body part 11 and is attached to or detached from a second Velcro-connection part 26 provided at an upper end of the backrest part 20.

The first Velcro-connection part 12 is provided on the rear surface of the headrest body part 11, protrudes downward at least partially, and may extend to face the second Velcro-connection part 26 provided on the backrest part 20.

The first Velcro-connection part 12 may be made of cotton, fabric, fiber, or the like, have one side fixed-connected with the headrest body part 11 and the other side on which many protrusions, such as fine hooks or the like, are integrally formed, and may be connected to be attached by coming in contact with the hook formed on the second Velcro-connection part 26 in a loop shape or to be detached form the hook.

Folding by a forward rotation of the headrest part 10 will be described in detail with reference to FIGS. 1 and 2.

FIG. 1 is a perspective view of a portable car seat according to one embodiment of the present invention, and FIG. 2 is an operational perspective view of the portable car seat according to one embodiment of the present invention.

In FIG. 1, the headrest part 10 is positioned above the backrest part 20 to be upright in series. In this case, the first Velcro-connection part 12 is connected with the second Velcro-connection part 26 to prevent the headrest part 10 from rotating forward and is fixed to the backrest part 20.

When the first Velcro-connection part 12 is disconnected from the second Velcro-connection part 26, the headrest part 10 rotates forward with respect to a portion bendably connected to the backrest part 20 as a center of rotation. As shown in FIG. 2, the headrest part 10 is positioned in front of the backrest part 20.

In the structure, since one side of the headrest part 10 bendably connected to the backrest part 20 is attached to or detached from the backrest part 20 by the first Velcro-connection part 12, the headrest part 10 is folded by rotating forward (see FIG. 2) when the first Velcro-connection part 12 is detached from the second Velcro-connection part 26, and thus the portable car seat 1 of the present invention can be easily carried. When the first Velcro-connection part 12 is attached to the second Velcro-connection part 26, the headrest part 10 is fixed to the backrest part 20 (see FIG. 1), and thus the back of the head of the infant (I) can be effectively protected.

Therefore, in the portable car seat 1 according to one embodiment of the present invention, the headrest part 10 is foldably formed to increase the portability of the portable car seat 1, and a rate of mounting the portable car seat 1 in the vehicle (not shown) is increased, and thus safety of the infant I may be practically secured.

Further, the headrest body part 11 includes a front supporting part 111 supporting back of the head of the infant I on a front side thereof, a right supporting part 112 supporting a right side of the head of the infant I, and a left supporting part 113 supporting a left side of the head of the infant I, and the right supporting part 112 or the left supporting part 113 may be adjusted according to a size of the head of the infant I.

The front supporting part 111 has a frame formed therein to be in contact with the back of the head of the infant I on a front side thereof to support the back of the head of the infant I and may be connected with the right supporting part 112 and the left supporting part 113 on the right and left of the headrest body part 11, respectively.

Each of the right supporting part 112 and the left supporting part 113 includes an aluminum plate formed therein to be bent and is adjustable to be inclined toward a head of the infant I from the front supporting part 111.

In the headrest body part 11, the right and left supporting part 112 and 113 are adjusted according to the size of the head of the infant I to enhance protection of the head of the infant and improve comfort.

The backrest part 20 is positioned above the seat part 30 and under the headrest part 10 to be in contact with a backbone part (back; not numbered) of the infant I so as to support the back of the infant I when the infant I sits on the seat part 30, and thus generally supports the infant I on the portable car seat 1. The backrest part 20 is mounted on the backrest part (not numbered) of the car seat S when the portable car seat 1 is mounted on the vehicle.

Particularly, the backrest part 20 is connected to a lower side of the headrest part 10 and an upper side of the seat part 30 to be in contact with the backbone part of the infant I.

The backrest part 20 includes a first backrest frame 21, which is in contact with the backbone part and supports the backbone part, and a second backrest frame 22 which vertically supports the backbone part when the portable car seat 1 is mounted on the car seat S. The first backrest frame 21 effectively supports the backbone part of the infant I, and the second backrest frame 22 allows the infant I to be generally supported on the car seat S, and a cushion, filled with an elastic material, such as cotton, sponge, spring, or the like, may be formed between the first backrest frame 21 and the second backrest frame 22.

An exterior of the backrest part 20 is formed as a cover to cover an interior thereof so as to protect the interior from external contaminants and allow other components to be easily connected with each other.

The first backrest frame 21 has a U-shape and has an upper portion partially bent rearward to be connected with the second backrest frame 22, a middle portion connected with the second backrest frame 22 by a first frame connection part 231 to be spaced apart a predetermined distance, and a lower portion connected with the second backrest frame 22 by a second frame connection part 232 to be spaced apart therefrom by a predetermined distance.

In this case, seat belt fixing buckles 24 may be firmly coupled to both sides of the front side of the middle portion of the first backrest frame 21 by welding and the like and may be coupled to both sides of the middle portion of the first backrest frame 21. The seat belt fixing buckle 24 is connected to a seat belt (not shown) provided on the car seat S, and the portable car seat 1 may be mounted on the car seat S.

The first backrest frame 21 includes a first backrest reinforced frame 251 and a second backrest reinforced frame 252 formed in a lateral direction so as to reinforce a tolerance to an external force, and thus a backbone part supporting force and protecting force of the infant I can be increased.

The rotation prevention part 70 is provided under the first backrest frame 21, and the first backrest frame 21 includes a rotation preventing point P2, which is in direct contact with the car seat S, and thus the seat part 30 and the rotation prevention part 70 may doubly restrict rotation in a direction in which a space, on which the infant I sits, is folded. This will be described below in detail in a description of the rotation prevention part 70.

The second backrest frame 22 has a U-shape and has an upper portion partially coupled to the first backrest frame 21 by welding and the middle portion and a lower portion connected with the first backrest frame 21 by the first frame connection part 231 and the second frame connection part 232 to be spaced apart a predetermined distance. The rotation connection part 60 is provided below the second backrest frame 22, which will be described below in detail in a description of the rotation connection part 60.

An upper portion of a front surface of the backrest part 20 may be bendably connected to the headrest part 10 (preferably, connected by an elastic band formed at an external cover), and a second Velcro-connection part 26 is provided at an upper side of a rear surface of the backrest part 20 to be attached to or detached from the first Velcro-connection part 12 provided at the headrest part 10, and thus the headrest part 10 may be fixed or folded forward.

Further, the backrest part 20 may be rotatably connected with the seat part 30 by the rotation connection part 60 formed under the second backrest frame 22, and the rotation prevention part 70 formed on the first backrest frame 21 may restrict rotation of the seat part 30.

This will be described below in detail in descriptions of the rotation connection part 60 and the rotation prevention part 70.

The seat part 30, which is a portion on which the infant I sits, is positioned under the backrest part 20 to face a hip part (not numbered) of the infant I, and is mounted on the seat part (not numbered) of the car seat S when the portable car seat 1 is mounted in the vehicle.

Specifically, the seat part 30 is perpendicularly connected to a lower portion of the backrest part 20 to directly face the hip part of the infant I.

The seat part 30 includes a seat frame 31 formed in a U-shape therein to support a hip part and includes a cushion filled with an elastic material, such as cotton, sponge, spring, or the like, to effectively protect the hip part and improve comfort.

The exterior of the seat part 30 is formed as a cover to cover the interior thereof so as to protect the interior from external contaminants and to provide a soft feel.

Further, since one side of the seat frame 31 is connected to the rotation connection part 60 formed at a lower portion of the second backrest frame 22, the seat part 30 is rotatably connected to the backrest part 20, and the rotation prevention part 70 formed to be spaced apart from one side of the seat frame 31 formed on the first backrest frame 21 may restrict rotation of the seat part 30.

This will be described below in detail in descriptions of the rotation connection part 60 and the rotation prevention part 70.

A backrest-cushion part 40 is connected to a front surface of the backrest part 20 to be in direct contact with the backbone part of the infant I, is filled with an elastic material, such as cotton or the like, to improve comfort when the infant I sits on the seat, and includes a left cover cushion 41 and a right cover cushion 42 formed at left and right sides thereof so that the infant I is pressed against the portable car seat 1 so as to easily protect the infant I.

The backrest-cushion part 40 includes a left shoulder belt cushion part 51 and a right shoulder belt cushion part 52 formed at a front surface thereof, which is in contact with the backbone part of the infant I, and a left buckle 521 and a right buckle 511 on belts B provided at the left and right shoulder belt cushion parts 51 and 52 are coupled to a fixing buckle 531 on the belt B provided on a belt fixing cushion part 53, which is provided on the seat part 30, and thus the infant I may sit on the portable car seat 1 with the belt over the shoulder.

The portable car seat 1 according to one embodiment of the present invention allows the infant I to be indirectly fixed to a vehicle by the belt B provided on the portable car seat 1 rather than by a seat belt of the vehicle.

The left and right buckles 511 and 521 and a fixing buckle 531 are slidably provided on the belts B. In the embodiment, the belts B are formed in a three point-harness belt-type but this is just an example, and a two-point belt type may be used.

The rotation connection part 60 is rotatably connected to the backrest part 20 and the seat part 30. Specifically, the rotation connection part 60 includes a rotation frame 62 fixed to a lower end of the second backrest frame 22 in a lateral direction and a rotation coupling unit 61 rotatably provided on the rotation frame 62 and connected to an end of the seat frame 31 of the seat part 30.

The rotation frame 62 serves as a rotating shaft allowing the backrest part 20 and the seat part 30 to rotate.

A rotation origin P1 is formed at a portion of the second backrest frame 22 connected with the rotation frame 62 to allow the backrest part 20 and the seat part 30 to rotate in a clockwise direction or counterclockwise direction.

An operation in which the backrest part 20 and the seat part 30 relatively rotate using the rotation connection part 60 will be described in detail with reference with FIGS. 7 and 8.

FIG. 7 is an operational perspective view of the frame of the portable car seat according to one embodiment of the present invention, and FIG. 8 is an operational side view of the frame of the portable car seat according to one embodiment of the present invention.

Referring to FIGS. 7A and 8A, shown on the left side of the FIGS. 7 and 8, when the portable car seat 1 is disposed on the car seat S so that the infant I sits in the vehicle, the backrest part 20 and the seat part 30 are perpendicularly connected with each other to be disposed in a chair form on which the infant I sits.

When the portable car seat 1 is removed from the car seat S, a rotational momentum generated when a force is applied to a seat part supporting point P3 of the seat part 30 allows the seat part 30 to maximally rotate in a counterclockwise direction with respect to the rotation origin P1 as an axis of rotation, after which the seat part 30 is disposed to face a rear surface of the backrest part 20 as shown in FIGS. 7B and 8B shown on the right side of the FIGS. 7 and 8.

In the portable car seat 1 according to the present invention, the backrest part 20 and the seat part 30 are folded by the rotation connection part 60, and thus portability can be increased.

Since a convention car seat does not rotate, the backrest part 20 and the seat part 30 are perpendicularly connected with each other, and the car seat is not easily carried due to occupying a great deal of space, and thus there is a problem in that the rate of mounting a car seat in a vehicle is very low.

In the embodiment of the present invention, the portable car seat 1 is simultaneously folded rearward by the rotation connection part 60 while the above-described headrest part 10 is folded forward, and a space occupied by the portable car seat 1 when the portable car seat 1 is carried is remarkably reduced, and thus the car seat 1 can be easily and practically carried. Thus, the rate of mounting the portable car seat 1 in the vehicle is increased, and safety of the infant I may be practically secured.

The rotation prevention part 70 stops the relative rotation of the backrest part 20 and the seat part 30 by the rotation connection part 60. Specifically, the rotation prevention part 70 includes a stopper 71 fixedly installed at a lower end of the first backrest frame 21 in a lateral direction, and a stopper facing part 72 fixedly installed in a lateral direction at a position facing the stopper 71 when the seat part 30 rotates to a position spaced apart from a portion, at which the seat part 30 is connected with the rotation coupling unit 61, by a predetermined distance.

The stopper 71 comes into contact with the stopper facing part 72 when the seat part 30 rotates in a clockwise direction so as to restrict rotation of the seat part 30. Preferably, the stopper 71 restricts rotation in a direction in which a space, in which the infant I sits, is folded.

In the portable car seat 1 of the present invention, the rotation preventing point P2, which is in direct contact with the car seat S, is provided on the first backrest frame 21 and can effectively restrict rotation in a direction in which a space, in which the infant I sits, is folded doubly along with the rotation prevention part 70.

The rotation preventing point P2 is formed to be spaced apart from the rotation origin P1 and formed at a lower end of the second backrest frame 22, a predetermined distance forward so as to restrict rotation in a direction in which the backrest part 20 is folded to a space in which the infant I sits.

The stopper 71 is positioned above the rotation preventing point P2 so as to primarily reduce a relative rotation force of the backrest part 20 and the seat part 30 due to the rotation preventing point P2, is in contact with the stopper facing part 72 so as to secondarily reduce a rotation force of the seat part 30, and completely offsets a rotation force of the backrest part 20 and the seat part 30.

Referring to FIGS. 7 and 9, an operation in which the rotation prevention part 70 restricts rotation of the backrest part 20 and the seat part 30 will be described in detail.

FIG. 7 is an operational perspective view of the frame of the portable car seat according to one embodiment of the present invention, and FIG. 9 is a perspective view showing an infant sitting on the portable car seat according to one embodiment of the present invention.

Referring to FIG. 7A, shown on the left of FIG. 7, the backrest part 20 and the seat part 30 of the portable car seat 1 are perpendicularly disposed. In this case, the stopper 71 provided in the first backrest frame 21 of the backrest part 20 is in contact with the stopper facing part 72 of the seat part 30 so as to restrict the seat part 30 from rotating toward a space of the portable car seat 1 in which the infant I sits. That is, the rotation prevention part 70 prevents an angle from the seat part 30 to the second backrest frame 22 in a clockwise direction from being less than or equal to 90°.

Therefore, the seat part 30 may be rotated about the backrest part 20 by the rotation prevention part 70 by an angle greater than 90° and less than 360°, and may be rotated about the second backrest frame 22 by an angle greater than 0° and less than 270° in a clockwise direction or counterclockwise direction.

Referring to FIG. 9, when the infant I leans forward after sitting on the portable car seat 1 and being fastened in with the belt B, the belt B holds the infant I to the backrest part 20 and the seat part 30 so as to generate rotational momentum that rotates the backrest part 20 and the seat part 30 toward a space in which the infant I sits.

The rotational momentum is easily generated when the vehicle quickly starts and brakes, and when the portable car seat 1 is formed as a foldable type, the backrest part 20 and the seat part 30 are automatically folded toward the space in which the infant I sits by forward leaning, which may be a threat to safety of the infant I.

To solve the problem, as described above, when the momentum of folding the seat part 30 toward a space, in which the infant I sits, by forward-leaning is generated, the portable car seat 1 of the present invention allows the rotation preventing point P2 to primarily remove a rotational momentum of the backrest part 20, and the rotation prevention part 70 secondarily offsets a rotation momentum of the seat part 30 by allowing the stopper 71 and the stopper facing part 72 to come into contact with each other so as to doubly prevent folding of the seat part 30, and thus a safety function of the portable car seat 1 is remarkably increased.

The present invention has been described in detail with reference to the exemplary embodiments. However, the exemplary embodiments should be considered in a descriptive sense only, and the present invention is not limited thereto. It should be clear to those skilled in the art that various modifications and improvements within the scope of the present invention may be made.

Simple modifications and alterations of the present invention fall within the scope of the present invention, and the scope of the present invention is defined by the accompanying claims.

The invention claimed is:

1. A portable car seat comprises:
   a seat part configured to have a child sit thereon, and which is configured to be mounted on a car seat;
   a backrest part connected to the seat part and configured to face a back of the child sitting on the seat part;
   a rotation part configured to rotatably connect the seat part to the backrest part; and
   a harness belt configured to hold the child sitting on the portable car seat to the backrest part and the seat part, wherein the seat part rotates about the backrest part and switches between a portable state in which the seat part is disposed to face a rear surface of the backrest part and a seating state in which the seat part is inclined toward a front surface of the backrest part and disposed to be in a chair form,
   wherein the backrest part includes:
      a backrest frame; and
      a reinforced frame formed in a width direction on the backrest frame, and
   wherein seat belt fixing buckles are coupled to both sides, in a width direction, of a front side of the backrest frame to fix a seat belt provided on a vehicle so that the backrest part is mounted on the car seat.

2. The portable car seat of claim 1, wherein the backrest frame includes:
   a rotation origin formed at a back side of a lower end thereof to allow the seat part to rotate,
   a rotation preventing point formed at the front side of the lower end thereof and being in contact with the car seat to prevent the backrest part from rotating toward a space in which the child sits, and
   wherein the rotation preventing point is positioned ahead of the rotation origin.

3. The portable car seat of claim 2, further comprising a backrest-cushion part connected to the front surface of the backrest part.

4. The portable car seat of claim 2, wherein the seat part includes:
   a seat frame; and
   a cover covering the seat frame.

5. The portable car seat of claim 2, wherein the rotation part includes:
   a rotation connection part rotating the seat part with respect to the backrest part; and
   a rotation prevention part restricting rotation of the seat part with respect to the backrest part.

6. The portable car seat of claim 5, wherein the rotation connection part includes:
   a rotation frame provided in the width direction at the lower end of the backrest frame and serving as a rotating shaft allowing the seat part to rotate; and
   a rotation coupling unit rotatably provided on the rotation frame and connected to an end of the seat part.

7. The portable car seat of claim 5, wherein the rotation prevention part includes:
   a stopper provided in the width direction at the lower end of the backrest frame; and
   a stopper facing part provided in the width direction at a position facing the stopper when the seat part rotates, and preventing rotation of the seat part toward a space in which the child sits.

8. The portable car seat of claim 1, wherein the harness belt includes a shoulder cushion part and a fixing buckle and allows the child to be indirectly fixed to the vehicle.

9. The portable car seat of claim 1, further comprising a headrest part positioned at an upper side of the backrest part to support a head of the child.

10. The portable car seat of claim 9, wherein the headrest part includes:
    a headrest frame; and
    a cover covering the headrest frame.

11. The portable car seat of claim 9, wherein the headrest part is provided to support back, left and right sides of the head of the child sitting on the seat part.

\* \* \* \* \*